C. A. WIRTH.
WATER GLASS VALVE.
APPLICATION FILED SEPT. 19, 1912.

1,201,128.

Patented Oct. 10, 1916.
2 SHEETS—SHEET 1.

WITNESSES
L. H. Schmidt
C. E. Tramer

INVENTOR
CHRISTIAN A. WIRTH,
BY
ATTORNEYS

C. A. WIRTH.
WATER GLASS VALVE.
APPLICATION FILED SEPT. 19, 1912.
1,201,128.
Patented Oct. 10, 1916.
2 SHEETS—SHEET 2.
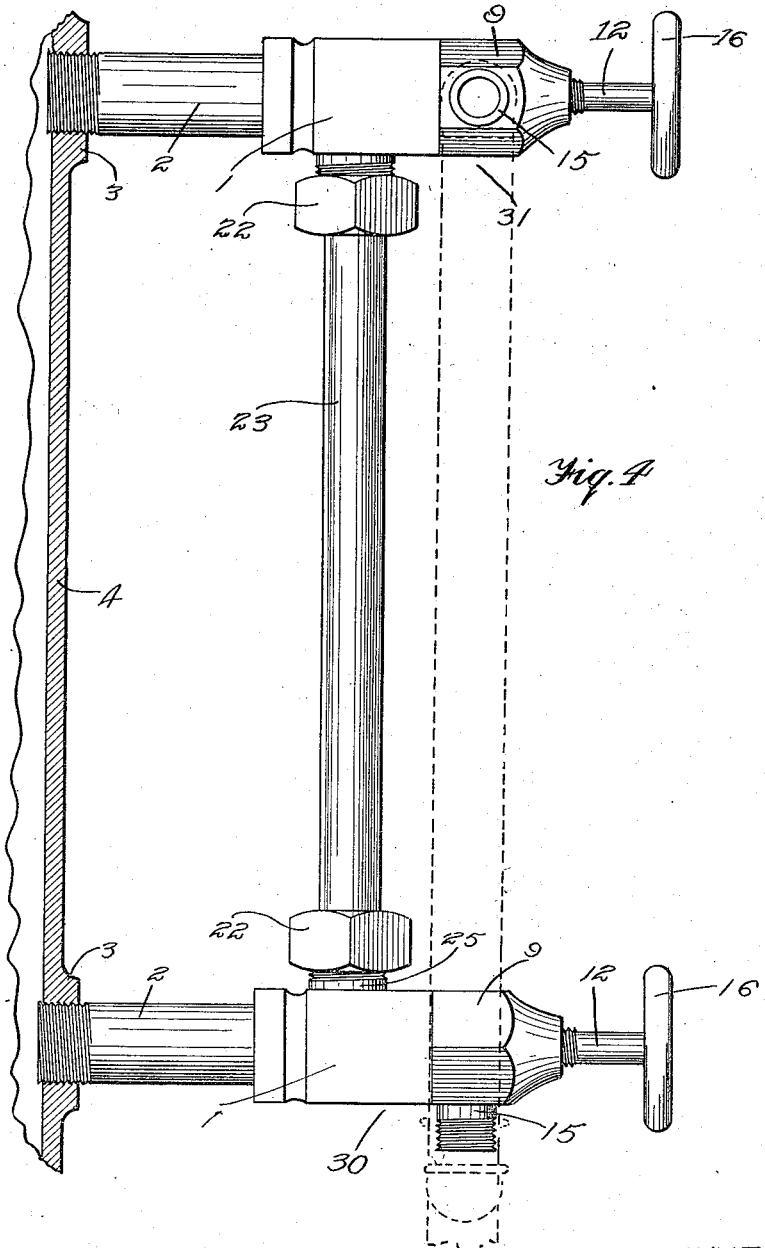
WITNESSES:
INVENTOR:
CHRISTIAN A. WIRTH
BY
HIS ATTORNEY.

UNITED STATES PATENT OFFICE.

CHRISTIAN A. WIRTH, OF ELLENSBURG, WASHINGTON.

WATER-GLASS VALVE.

1,201,128.  Specification of Letters Patent.  Patented Oct. 10, 1916.

Application filed September 19, 1912. Serial No. 721,243.

*To all whom it may concern:*

Be it known that I, CHRISTIAN A. WIRTH, a citizen of the United States, and a resident of Ellensburg, in the county of Kittitas and State of Washington, have invented certain new and useful Improvements in Water-Glass Valves, of which the following is a specification.

My invention is an improvement in water glass valves and has for its object the provision in connection with a valve of the character specified of means for preventing the closing or partial closing of the valve without warning to the engineer.

A further object of the invention is to provide means in connection with the valve for permitting the glass to be blown out, without any extra fittings and to enable a drainage valve to be dispensed with.

Figure 1:
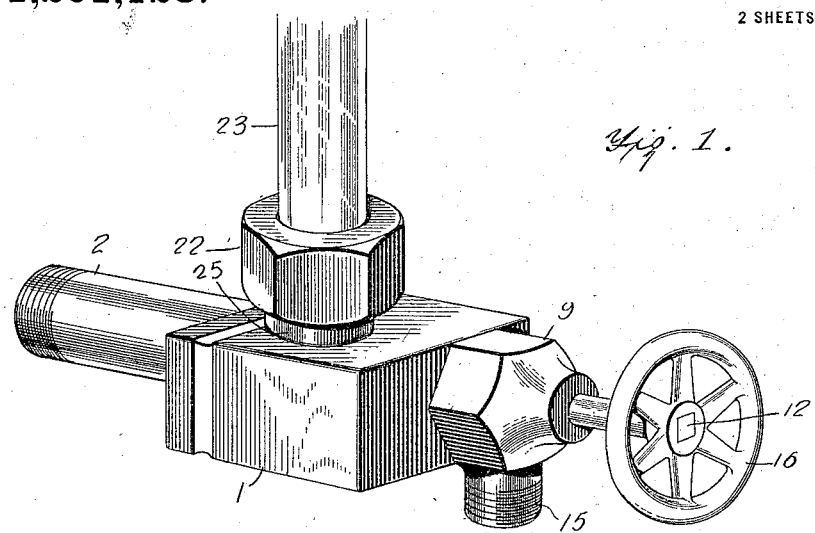
Figure 2:
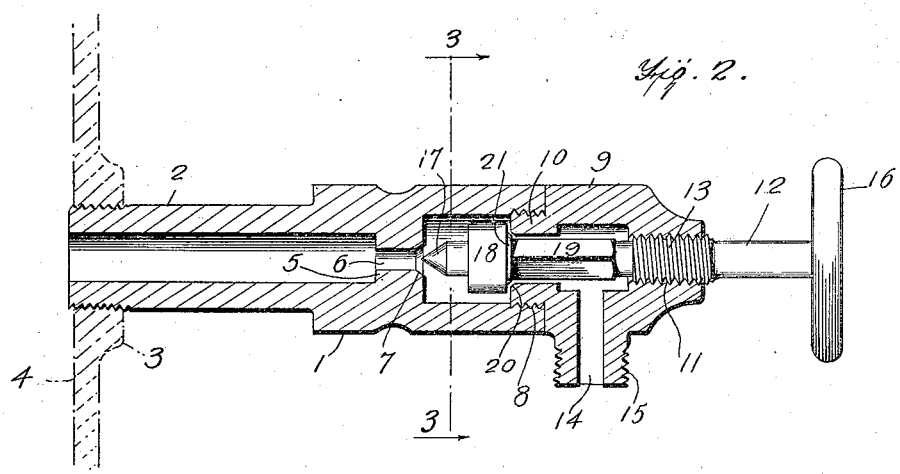
Figure 3:
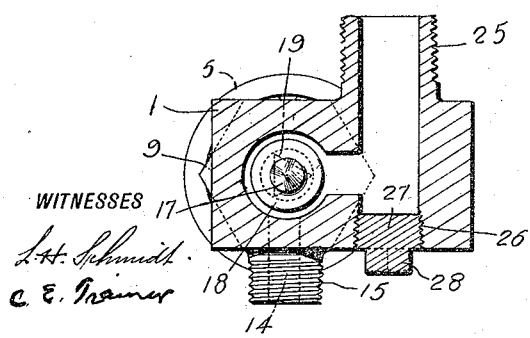

In the drawings: Figure 1 is a perspective view of the lower valve in place on a glass water gage; Fig. 2 is a longitudinal vertical section of the valve; and, Fig. 3 is a section on the line 3—3 of Fig. 2, looking in the direction of the arrows; Fig. 4 is an elevational side view of both valves in place on a glass water gage.

In the present embodiment of the invention, the valve casing 1 is rectangular in cross section, as shown, and is provided at one end with an integral tubular extension 2, which is externally threaded at its free end for engaging the nipple 3 of the boiler 4. The casing is provided with a diaphragm 5 at the end adjacent to the extension 2, and a central opening 6 is provided in the diaphragm, the said opening having a conical or tapering seat 7 at the end remote from the tubular extension. The opposite end of the casing 1 from the extension 2, is provided with an internally threaded opening 8, and a bonnet or nut 9 is provided with a nipple 10 engaging said opening 8. The nut 9 is internally threaded, as shown at 11 at the end remote from the nipple 10, and a valve stem 12 is provided with a threaded portion 13 for engaging the opening 11. The bonnet 9 is also provided with a lateral outlet nipple 14, at right angles to the opening for the valve stem 12, and the said nipple is externally threaded as shown at 15. The valve stem 12 is provided with the usual hand-wheel 16 at its outer end and the said stem is also provided with a conical end 17 at the end remote from the hand wheel 16 for coöperating with the tapering seat 7 to close the opening through the diaphragm. The stem is also provided with an annular integral rib or collar 18, adjacent to the tapering end 17, and the stem is enlarged adjacent to the collar or rib, and between the collar or rib and the threaded portion, as shown at 19, and the said enlargement is polygonal in cross section. The enlargement 19 moves in the opening of the nipple 10, and the inner end of the said opening of the nipple 10 is tapered or conical, as shown at 20, to form a seat. The stem is provided with a conical or tapering face 21 between the collar or rib 18 and the enlargement 19, for coöperating with the seat 20 to close the inner end of the opening of the nipple 10. The packing nut or fitting 22 for the lower end of the glass tube 23 which constitutes the water gage, is engaged with an opening in the upper face of the casing and the opening for the said fitting 22 is offset laterally with respect to the nipple 14.

In operation, the valve stem 12 may be manipulated to close the communication between the boiler and the tube 23, by turning the said valve until the conical end 17 fits tightly against the seat 7. As shown in Fig. 4, the glass tube 23 is held in place between a lower valve 30 and an upper valve 31 communicating with the boiler so that when the stems 12 of the two valves are manipulated by means of the hand wheels 16, as above described, the tube 23 is cut off from the boiler. At the same time, however, the portion 21 of each valve is moved away from the seat 20, thus placing the interior of the tube 23 and of the casings 1 in communication with the atmosphere. When it is desired to place the tube 23 in communication with the boiler, the stems 12 of the two valves 30 and 31 are turned until the portion 21 of each valve fits tightly against the seat 20. When the stems 12 are so arranged, the boiler is in communication with the water gage at both ends of the said gage. Should through inadvertence or accident of any character, the valve stems 12 be turned to shut off or partially shut off either end of the gage from the boiler, the said gage will immediately be placed in communication with the atmosphere and the pressure of the boiler will blow out through the gage and through the misplaced valve, thus warning the engineer or person in charge that the valve has been misplaced. The slightest turn of the valve stems 12 will permit this blow out or leakage, and it will be clearly evident that neither valve may be misplaced without full and ample warning. When it is desired to blow out the gage to cleanse the same, either valve may be turned to cut off that end of the gage from the boiler. It will be evident that when the lower valve 30 is turned to cut off the lower end of the gage from the boiler, the pressure of the boiler will blow out through the gage and through the lower valve.

The operation may be reversed by opening the lower valve and closing the upper, when the blow out will be at the upper end of the gage. The gage may be thus thoroughly cleansed to break up any deposits that may accumulate in the fittings. It is a well known fact that such deposits are annoying and dangerous for the reason that the engineer cannot be certain that his engine is properly supplied with water. In addition, there is no packing to become hardened or to shrink, thus preventing the proper shutting off of the gage. There will always be an exact coincidence or register between the water of the gage and the water of the boiler, so that the possibility of errors on the part of the engineer is greatly lessened. The gage may be perfectly drained to prevent freezing or the like, by shutting off both valves.

The polygonal shape of the stem as shown at 19, is to permit water and steam to escape through the bonnet 9, and there is ample drainage for the purpose between the said polygonal portion and the interior of the nipple 10. The provision of the bonnet 9 permits the use of an integral valve, that is the rib or collar 18. By unscrewing the bonnet, the entire valve and stem may be removed for cleaning purposes.

It will be evident that a drainage tube may be connected with the nipple 15 to conduct the flow of water and steam away from the boiler as shown in dotted lines in Fig. 4. The nut 9 and the packing nut 22 are made polygonal for convenience of removal that is for engagement by a wrench or the like. It will be noted that the casing 1 is provided with a nipple 25 in its upper face, the said nipple being externally threaded for engagement by the nut 22 before mentioned. An opening 26 is provided in alinement with the nipple 25, in the lower face of the casing 1, and the said opening is closed by a plug 27, having a polygonal outer end 28, for the engagement of a wrench to remove the said plug.

I claim:—

1. The combination with the boiler and the water gage, of a valve casing at each end of the gage, each casing having a chamber communicating with the adjacent end of the gage, and a tubular extension for connection with the boiler, each casing having a valve seat between the chamber and the extension and port on the opposite side of the chamber from the valve seat, and a valve in each chamber effecting connection of the gage with the boiler or with the atmosphere through said port.

2. In a device of the class described, the combination of a pair of gage cocks, each thereof having two valve seats and a single valve member, a gage glass held between said cocks, each valve casing being provided with a vent opening outside of the outer valve seat, the arrangement being such that neither cock can be closed and water trapped in the gage glass, substantially as described.

CHRIS A. WIRTH.

Witnesses:
C. R. HADLEY,
T. A. HARRIS.

Copies of this patent may be obtained for five cents each, by addressing the "Commissioner of Patents, Washington, D. C."